United States Patent [19]
Bingham et al.

[11] 4,223,340
[45] Sep. 16, 1980

[54] IMAGE DETAIL IMPROVEMENT IN A VERTICAL DETAIL ENHANCEMENT SYSTEM

[75] Inventors: Joseph P. Bingham, Carmel; William A. Lagoni, Indianapolis, both of Ind.

[73] Assignee: RCA Corporation, New York, N.Y.

[21] Appl. No.: 38,204

[22] Filed: May 11, 1979

[51] Int. Cl.$^2$ ............................................. H04N 9/535
[52] U.S. Cl. ........................................ 358/31; 358/36; 358/37
[58] Field of Search ....................... 358/22, 31, 32, 36, 358/37, 39, 166, 167, 184; 330/97, 103, 110, 282; 307/230; 328/142, 143

[56] References Cited

U.S. PATENT DOCUMENTS

| 3,715,477 | 2/1973 | Olson et al. | 358/167 |
| 3,798,353 | 3/1974 | Illetschko | 358/37 |
| 4,074,321 | 2/1978 | Miller | 358/31 |
| 4,096,516 | 1/1978 | Pritchard | 358/31 |

OTHER PUBLICATIONS

McMann et al., "Improved Signal Processing Techniques In Color Television Broadcasting", *Journal of SMPTE*, Mar. 1968, vol. 77, pp. 221-228.

*Primary Examiner*—John C. Martin
*Attorney, Agent, or Firm*—Eugene M. Whitacre; William H. Meagher; Ronald H. Kurdyla

[57] ABSTRACT

In a color television receiver including a comb filter for separating luminance and chrominance components of a color television signal, a network is included for enhancing vertical image detail to enhance vertical resolution in the luminance content of a displayed image. The comb filter provides a combed luminance signal output from which vertical detail signal information has been unavoidably deleted, and a combed chrominance signal output including signal frequency components representative of the deleted detail signal, which are selectively extracted from the combed chrominance signal. Low level detail signals are restored to the combed luminance signal via a first signal processing network which exhibits a prescribed signal restoration gain. The detail signal is also added to the combed luminance signal via a second network which cores (removes) low level detail signals including noise in a first operating mode, and amplifies higher level detail signals to enhance vertical image definition in a second mode. Rapid transitions from the coring to the enhancement mode are undesirably manifested in a displayed diagonal image as serrations along the edge of the diagonal line. The visible effects of the serrations are reduced to an acceptable minimum by low pass filtering the enhanced cored detail signal before being added to the combed luminance signal.

5 Claims, 8 Drawing Figures

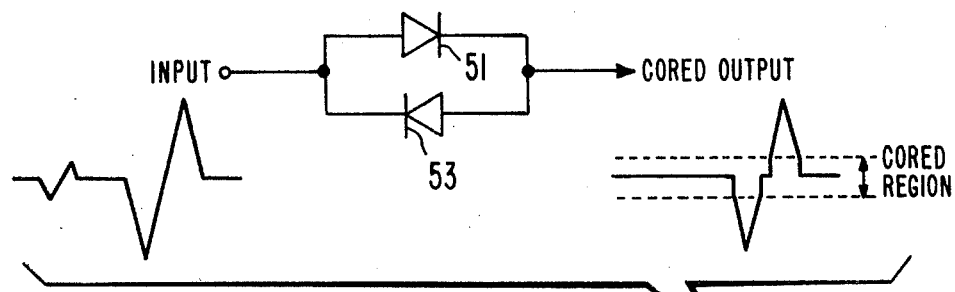
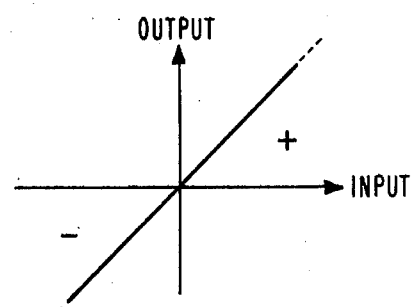
Fig. 2.
Fig. 3.
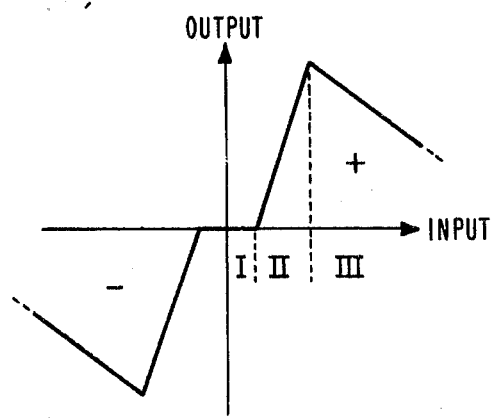
Fig. 4.
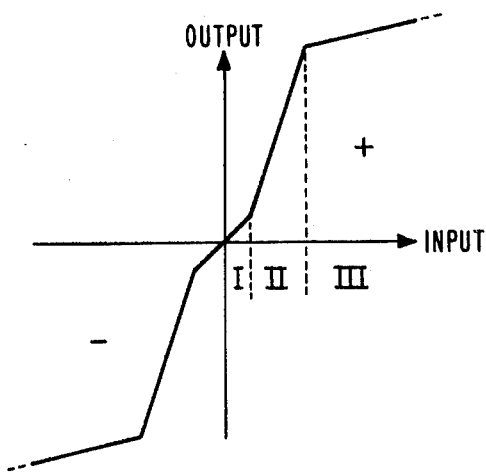
Fig. 5.

IMAGE DETAIL IMPROVEMENT IN A VERTICAL DETAIL ENHANCEMENT SYSTEM

This invention concerns an arrangement, such as may be employed in a color television receiver having a comb filter or the like for separating the luminance and chrominance components of a color television signal, for improving the definition of a displayed diagonal or similar image associated with a television signal subject to coring and enhancement of picture vertical detail signal information.

In a color television system such as the system developed by the United States, the luminance and chrominance components of a color television signal are disposed within the video frequency spectrum in frequency interleaved relation, with the luminance components at integral multiples of the horizontal line scanning frequency and the chrominance components at odd multiples of one-half the line scanning frequency. Various comb filter arrangements for separating the frequency interleaved luminance and chrominance components of the video signal are known, for example, from U.S. Pat. No. 4,143,397 (D. D. Holmes) and U.S. Pat. No. 4,096,516 (D. H. Pritchard) and the references cited therein.

A combed luminance signal which appears at the luminance output of the comb filter has been subjected to a "combing" effect over its entire band. The combing action over the high frequency band portion which is shared with chrominance signal components has the desired effect of deleting chrominance signal components. Extension of this combing action into the low frequency band portion which is not shared with the chrominance signal components, however, is not needed to effect the desired removal of chrominance signal components, and serves only to unnecessarily delete luminance signal components. Components in the lower end of this unshared band which are subject to such deletion are representative of "vertical detail" luminance information. Preservation of such vertical detail is desirable to avoid loss of vertical resolution in the luminance content of a displayed image.

One arrangement for preserving the vertical detail information employs a low pass filter coupled to the output of the comb filter at which the "combed" chrominance component appears. The upper cut-off frequency of this filter lies below the band occupied by the chrominance signal component (with an illustrative choice being just below 2 MHz). The filter selectively couples signals below the chrominance band from the chrominance output of the comb filter to a combining network where the selectively coupled signals are summed with combed luminance output signals from the comb filter. The combined signal includes a "combed" high frequency portion (occupying a band of frequencies above the filter cut-off frequency) from which chrominance signal components have been removed, and an uncombed (i.e., "flat") low frequency portion in which all luminance signal components have been preserved.

It is sometimes desirable to enhance the vertical detail information of a displayed image by adding back to the luminance signal a greater amount of the vertical detail signal than is required to restore the luminance signal to its original form (i.e., a "flat" amplitude characteristic). The additional vertical detail signal then serves to emphasize or peak vertical detail information so as to enhance picture detail resolution. For low level luminance signals, however, such enhancement tends to produce objectionable visible effects when noise interference is present and undesirably enhanced along with the vertical detail information of the luminance signal.

Also in this instance, alternate line set-up variations (ALSUV) when present in the video signal are also undesirably enhanced. The ALSUV phenomenon is a form of low level signal interference manifested by variations in the black level of the video signal from line-to-line, and may be caused by misalignment of signal processing systems at the broadcast transmitter, for example. The ALSUV interference is particularly noticeable for low level video signals of about five percent of the maximum expected video signal amplitude, and produces objectionable visible effects on a reproduced image which are undesirably magnified when vertical detail enhancement is provided.

A technique for minimizing the adverse effects of noise and other undesirable components of a video signal employs a process commonly referred to as signal "coring", wherein small amplitude excursions of the signal (including noise) are removed as described in U.S. Pat. No. 3,715,477 for example.

One advantageous system for providing vertical detail signal restoration and enhancement substantially without simultaneously enhancing interfering signal components such as noise and alternate line set-up variations, is described in a copending, concurrently filed U.S. patent application Ser. No. 38,202 of W. A. Lagoni and J. S. Fuhrer entitled "Video Image Vertical Detail Restoration And Enhancement" and assigned to the present assignee. As described therein, vertical detail signals are selectively derived from the combed chrominance output of a comb filter. A non-linear signal processor included in a vertical detail enhancement path cores the detail signal to remove small amplitude excursions including noise, and enhances (amplifies) moderately large amplitude excursions to enhance vertical detail resolution in the luminance content of a displayed image.

When a detail signal with moderately large amplitude excursions is processed, a rapid amplitude gain transition is manifested between the cored level of the detail signal, and the amplified enhanced level of the detail signal from the non-linear processor. This rapid transition, which appears as an amplitude discontinuity in the time domain, desirably assists to provide a well-defined boundary between the operating range wherein detail signals are cored, and the operating range wherein detail signals are enhanced.

It is herein recognized, however, that the discontinuities associated with such rapid transitions can produce an objectionable visible effect upon a displayed image. Specifically, manifestations of the discontinuities appear as serrations along the edge of a displayed diagonal or similar image pattern. The image serrations may also be attributable to the content of a received television signal, in which case the serrations may be magnified in effect by the coring and amplifying action of the non-linear vertical detail signal processor. Vertical detail signal processing apparatus described herein is arranged to reduce the visible effects of such serrations to an acceptable minimum.

Video image vertical detail signal processing apparatus according to the invention is included in a system for processing a video signal containing image representative luminance and chrominance components disposed within a frequency spectrum of said video signal in frequency interleaved relation. The system includes a comb filter for providing at a first output a combed luminance signal with amplitude peaks at integral multiples of an image line scanning frequency, and amplitude nulls odd multiples of one-half the line frequency. The comb filter also provides at a second output a combed chrominance signal with amplitude peaks at odd multiples of one-half the line frequency, and amplitude nulls at integral multiples of the line frequency. Signals provided at the second output of the comb filter include signal frequencies representative of luminance vertical image detail information absent from the combed luminance signal at the first comb filter output. A filter network coupled to the second output of the comb filter selectively passes signal frequencies corresponding to the vertical detail signal information, to the exclusion of signals occupying the band of chrominance signal frequencies. A signal translating network translates small amplitude excursions of the vertical detail signal with a first gain greater than zero, and moderate amplitude excursions of the vertical detail signal with a second gain greater than the first gain. The signal translating network includes a non-linear signal processor and a low pass filter for filtering output signals from the non-linear signal processor to remove signals occupying the band of frequencies above the vertical detail signal frequencies. The translated vertical detail signals are combined with the combed luminance signal from the first output of the comb filter to provide a reconstituted luminance component, which is afterwards supplied to a luminance signal utilization network.

In the drawing:

FIG. 2 shows a circuit suitable for use with the arrangement of FIG. 1;

FIGS. 3-5 depict amplitude response characteristics of the apparatus of FIG. 1, which are useful in understanding the operation of the invention.

Figure 1:
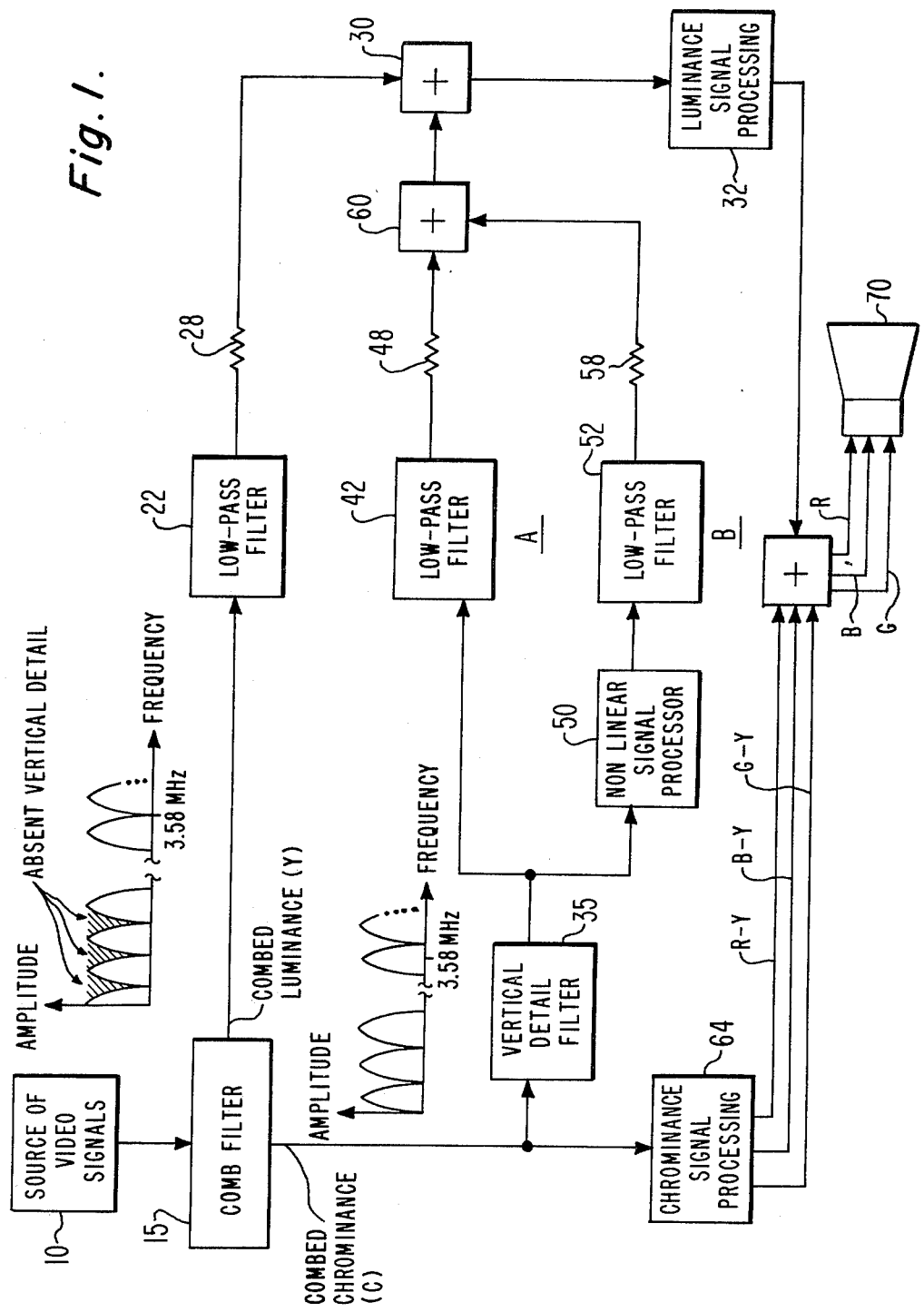
FIG. 1 illustrates a block diagram of a portion of a color television receiver employing apparatus according to the present invention.

In FIG. 1, a source of composite color video signals 10 including luminance and chrominance components supplies video signals to an input of a comb filter 15 of known configuration, such as a comb filter employing charge coupled devices (CCD's) as shown in U.S. Pat. No 4,096,516. The luminance and chrominance components are arranged within the video signal frequency spectrum in frequency interleaved relation. The luminance component has a relatively wide bandwidth (extending from D. C. or zero frequency to about four megahertz). The upper frequency range of the luminance component is shared with the chrominance component, which comprises a subcarrier signal of 3.58 MHz amplitude and phase modulated with color information. The amplitude versus frequency response of comb filter 15 with respect to luminance combing action exhibits a peak amplitude response at integral multiples of the horizontal line scanning frequency (approximately 15,734 Hz), extending from D. C. or zero frequency, and an amplitude null at odd multiples of one-half the line scanning frequency, including the 3.58 MHz chrominance subcarrier frequency. The amplitude versus frequency response of comb filter 15 with respect to chrominance combing action exhibits a peak amplitude response at odd multiples of one-half the line frequency including 3.58 MHz, and an amplitude null at integral multiples of the line frequency.

A "combed" luminance signal (Y) from the luminance output of comb filter 15 is coupled via a low pass filter 22 and a weighting resistor 28 to one input of a signal combining network 30. Filter 22 is arranged to pass all luminance signals below a cut-off frequency of approximately 4 MHz, and serves to remove noise and clock frequency components of switching signals associated with the switching operation of comb filter 15 when of a CCD type comb filter.

A "combed" chrominance signal (C) from the chrominance output of comb filter 15 is applied to a chrominance signal processing unit 64 for generating R-Y, B-Y and G-Y color difference signals, and to an input of a low pass vertical detail filter 35. Unit 64 includes a filter suitable for passing only those signal frequencies from comb filter 15 which occupy the band of chrominance signal frequencies. Filter 35 exhibits a cut-off frequency of approximately 1.8 MHz, and selectively passes those signal frequencies present in the combed chrominance signal output of comb filter 15 which lie below this cut-off frequency. Signal frequencies in this region represent vertical detail luminance information which is absent from the combed luminance signal and which must be restored to the luminance signal to avoid loss of vertical resolution in the luminance content of a displayed image. Such vertical detail restoration as well as vertical detail enhancement is accomplished as follows.

Vertical detail signals from the output of filter 35 are coupled via a signal restoration path A including a low pass filter 42 and a weighting resistor 48, to one input of a signal combining network 60. Low pass filter 42 exhibits a cut-off frequency of approximately 2 MHz. The amplitude transfer characteristics of path A is linear and manifests a prescribed restoration gain for both positive and negative signal polarities. The magnitude of the restoration gain preferably corresponds to that amount of signal gain which, in a given system, is required to restore small amplitude excursions of the vertical detail component to the luminance signal so that an ultimately reconstituted luminance signal exhibits an essentially "flat" amplitude response with respect to small amplitude detail signals. In this connection it is noted that the magnitude of the restoration gain is a function of various factors, including the signal translating characteristics of networks coupled between the outputs of comb filter 15 and a luminance processor 32 which processes ultimately reconstituted luminance signals, and the relative magnitudes of the signals appearing at the outputs of comb filter 15, for example.

Vertical detail signals from filter 35 are also applied to a vertical detail enhancement signal processing path B, which comprises the cascade combination of a non-linear signal processing network 50, a low pass filter 52, and a signal weighting resistor 58. Signals processed by path B are applied to a second input of combining network 60, which combines the vertical detail restoration signals from path A with the vertical detail enhancement signals from path B to produce a desired output response as will be discussed.

The combination of vertical detail filter 35 with restoration filter 42 establishes the signal bandwidth of restoration path A, and the combination of vertical detail filter 35 with filter 52 establishes the signal bandwidth of enhancement path B, such that chrominance signal frequencies are greatly attenuated.

In this example, low-pass filter 52 exhibits a cut-off frequency of approximately 1.8 MHz for attenuating signal frequencies within and above the chrominance signal frequency band. Filter 52 serves to improve image definition particularly with respect to effects which may appear as visible disturbances along the edge of a displayed diagonal image pattern, as will be discussed in greater detail subsequently.

Signal processor 50 includes a diode signal coring network of the general type shown in FIG. 2, including diodes 51 and 53 (e.g., type HP2800) which are coupled in inverse parallel relationship and which conduct in response to opposite polarity signals, respectively. Additional details of coring circuits of this type can be found in U.S. Pat. No. 3,715,477, and in a copending, concurrently filed U.S. patent application Ser. No. 38,100 of W. A. Lagoni entitled "Signal Processing Circuit Having A Non-Linear Transfer Function."

The amplitude transfer characteristic of signal processor 50, and also the transfer characteristic for signals developed at the second input of combining network 60 via path B, is illustrated by FIG. 4. The following remarks concerning the response to positive (+) polarity signals also apply to signals of negative (−) polarity.

The coring, paring and amplifier circuits within processor 50 produce a signal amplitude transfer (gain) characteristic, as shown in FIG. 4, for three regions I, II and III with respect to three predetermined ranges of vertical detail signal amplitude. The coring circuit produces a response corresponding to zero gain within a first region for low level signals (e.g., signal amplitudes of about five percent of maximum expected amplitude). That is, the coring circuit inhibits the low level signals to prevent their enhancement in path B, along with noise and other undesired components. The amplifier stage within processor 50 amplifies vertical detail signals of moderate amplitude (e.g., signal amplitudes between about five percent and forty percent of maximum expected amplitude) within region II with a gain of approximately three, for example, to thereby emphasize the vertical detail information and increase picture contrast in this region. Relatively large amplitude vertical detail signals (e.g., corresponding to high contrast images such as lettering) are reduced in amplitude or "pared" as indicated by the amplitude response in region III, to avoid excessive contrast and to prevent kinescope "blooming" which would otherwise distort or obscure picture detail.

A combined vertical detail signal produced at the output of combining unit 60 exhibits an amplitude characteristic in accordance with the amplitude transfer characteristic shown in FIG. 5. The transfer characteristic of FIG. 5 represents a composite transfer characteristic including the transfer characteristic of FIG. 3 (for restoration path A) combined with that of FIG. 4 (for enhancement path B). A circuit for producing the transfer function shown in FIG. 4 is disclosed in a copending, concurrently filed U.S. patent application Ser. No. 38,015 of W. A. Lagoni entitled "Controllable Non-Linear Processing Of Video Signals," and assigned to the present assignee.

It is noted that in region I (vertical detail restoration), low level vertical detail signal information has been restored in an amount sufficient to preserve normal low level vertical resolution in the luminance content of a dispalyed image. The choice of the restoration gain as provided by the amplitude transfer response for region I (see FIGS. 1 and 3) involves considerations of what results are acceptable in a given video signal processing system. Additional information concerning this matter is found in the aforementioned copending U.S. patent application of W. A. Lagoni and J. S. Fuhrer.

In region II (vertical detail enhancement), an appropriate amount of vertical detail enhancement has been provided by imparting additional gain to signals of moderate amplitude in a manner which is considered to benefit vertical resolution of a displayed image. Since only signals processed by the enhancement path are cored and signals processed by the restoration path are translated with the restoration gain, image "smear" of low level vertical detail information is avoided and enhancement of undesirable low level signal components including noise and ALSUV interference is essentially eliminated or reduced to an acceptable minimum. Additional information concerning the composite non-linear response of FIG. 5, including region III (vertical detail pared) is disclosed in a copending, concurrently filed U.S. patent application Ser. No. 38,203 of J. S. Fuhrer entitled, "Non-Linear Processing Of Video Image Vertical Detail Information" and assigned to the present assignee.

It is also noted that the described vertical detail signal processing arrangement is unaffected by variations in the D.C. level of the luminance component. Due to the manner in which a comb filter derives a combed chrominance signal by employing a subtractive signal combining process as is known, the combed chrominance signal exhibits a zero D.C. component. Coring of the vertical detail signal, as derived from the comb filter chrominance output, can therefore be accomplished predictably about the D.C. bias level developed at the comb filter chrominance output and which corresponds to the center of the "core." Since the reference level about which coring is accomplished is fixed predictably, the signal coring range is well-defined and assists to provide well-defined restoration, enhancement and paring regions as discussed.

Figure 6:
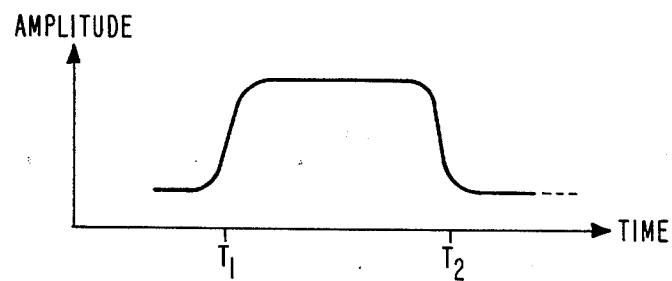
FIGS. 6-8 illustrate signal waveforms useful in understanding the operation of the invention.

Referring now to FIG. 6, there is shown a waveform corresponding to a vertical detail signal associated with a video signal representative of a diagonal or similar image pattern, after filtering by filter 35. This waveform corresponds to the vertical detail signal associated with a single image element in a given image line interval. Although only a single image detail element is shown, it is understood that a displayed diagonal image pattern consists of one or more image elements for each of several sequential image line scanning intervals, displaced in time as between adjacent image lines to form a diagonal display pattern. In this example, a leading edge of the diagonal signal occurs at a time $T_1$, and a lagging edge occurs at a later time $T_2$.

Figure 7:
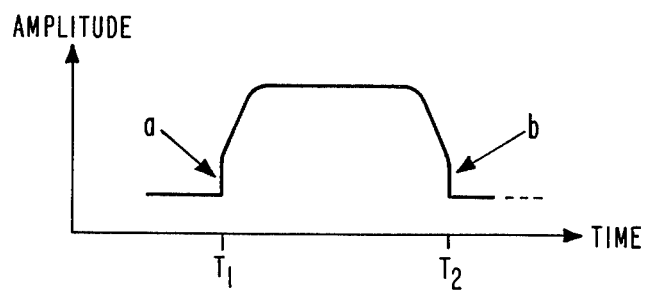

FIG. 7 depicts the detail signal of FIG. 6 at the output of non-linear processor 50. In this example, the detail signal is assumed to be of moderate amplitude subject to enhancement in region II as discussed. The portion of the signal prior to time $T_1$ and after time $T_2$ results from the coring action of processor 50, wherein small amplitude excursions of the detail signal are inhibited.

At time $T_1$ associated with the leading edge of the detail signal, when the amplitude of the detail signal exceeds the coring range, processor 50 amplifies the detail signal to provide detail enhancement until the peak of detail signal is reached. Enhancement is provided until time $T_2$, when the amplitude of the detail signal is again within the coring range. It is noted that rapid amplitude transitions or amplitude discontinuities "a" and "b" occur at times $T_1$ and $T_2$, respectively, due to the differences in gain associated with the cored and enhanced (amplified) portions of the processed detail signal. These discontinuities appear in a displayed diagonal image pattern as objectionable serrations or "stairsteps" (i.e., a form of ripple) along the edges of the diagonal pattern.

Figure 8:
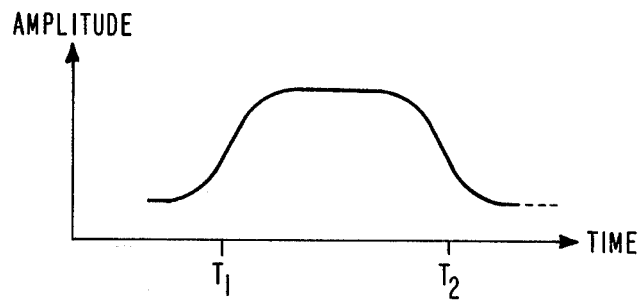

The visible impact of these serrations is reduced to an acceptable minimum by means of low pass filter 52, which serves to smooth or average out the serrations by filtering high frequency signal components associated with the rapid transitions occurring at times $T_1$ and $T_2$. FIG. 8 illustrates the detail signal after filtering by filter 52.

The cut-off frequency of low pass filter 52 (approximately 1.8 MHz in this instance) is chosen sufficiently low so as to reduce the visible effects of the serrations to an acceptable minimum, consistent with providing an appropriately wide bandwidth for the enhanced detail signals, and with greatly attenuating chrominance signal frequencies in the detail enhancement path to prevent contamination of the luminance signals with color information (e.g., in the form of "color dot" interference). Thus filter 52 is arranged to substantially inhibit frequencies within the range of chrominance signal frequencies.

The processed vertical detail signal appearing at the output of combining network 60 is summed in network 30 with the combed luminance signal supplied via filter 22. The output signal from combiner 30 corresponds to a reconstituted luminance component of the video signal, with the vertical detail information thereof restored and enhanced as discussed. The reconstituted luminance component is afterwards coupled to a luminance signal processing unit 32. An amplified luminance signal Y from unit 32 and the color difference signals from chrominance unit 64 are combined in a matrix 68 for providing R, B and G color image representative output signals. These signals are then suitably coupled to image intensity control electrodes of a color kinescope 70.

Signal weighting resistors 28, 48 and 58 are proportioned in value so that appropriate amounts of the combined luminance signal and processed vertical detail signals when combined produce a desired level of the luminance component which ultimately appears at the output of combiner 30. The signal propagation delays associated with paths A and B are equalized by means of the signal delays associated with filters 42 and 52. Also, the signal propagation delays between the luminance output of comb filter 15 and the first input of combiner 30 via path A, and the chrominance output of comb filter 15 and the second input of combiner 30 via path B, are equalized by means of the delay associated with filter 22 and the delay associated with filters 35, 42 and 52 in the vertical detail signal path.

Although combining networks 30 and 60 are shown as separate units in FIG. 1, it should be recognized that these two combining networks could be replaced by a single, three-input combining network for summing the combed luminance signal from comb filter 15 with the vertical detail signals coupled via paths A and B.

What is claimed is:

1. Video image vertical detail signal processing apparatus in a system for processing a video signal containing image representative luminance and chrominance components disposed with a frequency spectrum of said video signal in frequency interleaved relation, said system including comb filter means for providing at a first output a combed luminance signal with amplitude peaks at integral multiples of an image line scanning frequency and amplitude nulls at odd multiples of one-half said line frequency, and for providing at a second output a combed chrominance signal with amplitude peaks at odd multiples of one-half said line frequency and amplitude nulls at integral multiples of said line frequency, and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail signal information, to the exclusion of signals occupying the band of chrominance signal frequencies;

means for translating small amplitude excursions of said vertical detail signal with a first gain and for translating moderate amplitude excursions of said vertical detail signal with a second gain greater than said first gain, said translating means including a non-linear signal processor and low pass filter means for filtering output signals from said non-linear signal processor to remove signals occupying the band of frequencies above said vertical detail signal frequencies;

means for combining signals translated by said translating means with said combed luminance signal from said first output of said comb filter means to provide said luminance component; and luminance signal utilization means for receiving said luminance component from said combining means.

2. Apparatus according to claim 1, wherein:
said low pass filter means attenuates signals occupying the band of chrominance signal frequencies.

3. Apparatus according to claim 1, wherein said signal translating means comprises:

a first signal path for translating said vertical detail signal with said first gain;

a second signal path including said non-linear signal processor for removing small amplitude excursions of said vertical detail signal, said second path also including said low pass filter means; and means for combining signals translated by said first and second signal paths.

4. Apparatus according to claim 1, wherein:
said frequency selective means comprises a low pass filter.

5. Video image vertical detail signal processing apparatus in a color television receiver for processing a color television signal containing image representative luminance and chrominance components disposed within a frequency spectrum of said television signal in frequency interleaved relation, said receiver including comb filter means for providing at a first output a combed luminance signal with amplitude peaks at integral multiples of an image line scanning frequency and amplitude nulls at odd multiples of one-half said line frequency, and for providing at a second output a combed chrominance signal with amplitude peaks at odd multiples of one-half said line frequency and wherein signals provided at said second output include signal frequencies representative of luminance vertical image detail information absent from said combed luminance signal at said first output, said apparatus comprising:

means coupled to said second output of said comb filter means for selectively passing said signal frequencies corresponding to vertical detail signal information, to the exclusion of signals occupying the band of chrominance signal frequencies;

means for translating small amplitude excursions of said vertical detail signal with a first gain, and for translating moderate amplitude excursions of said vertical detail signal with a second gain greater than said first gain, said translating means including a non-linear signal processor and low pass filter means for filtering output signals from said non-linear signal processor to remove signals occupying the band of frequencies above said vertical detail signal frequencies;

means for combining signals translated by said translating means with said combed luminance signals from said first output of said comb filter means to provide said luminance component; and luminance signal utilization means for receiving said luminance component from said combining means.

* * * * *